S. G. EDWARDS.
PERPETUAL CALENDAR.
APPLICATION FILED APR. 10, 1919.
1,345,150.
Patented June 29, 1920.
5 SHEETS—SHEET 1.
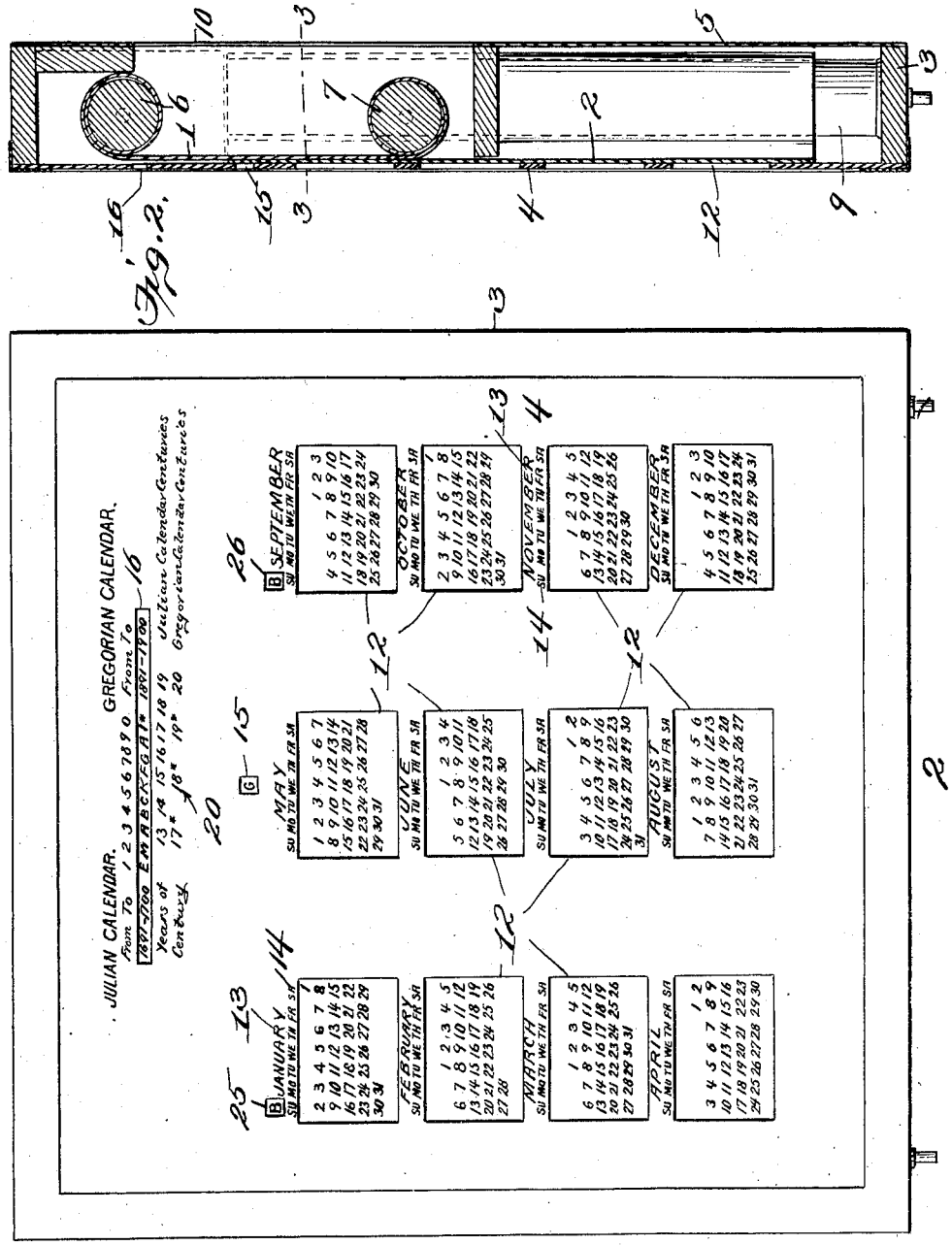
Inventor
Sidney G. Edwards
By
Attorney
Witness S. G. EDWARDS.
PERPETUAL CALENDAR.
APPLICATION FILED APR. 10, 1919.
1,345,150.
Patented June 29, 1920.
5 SHEETS—SHEET 2.
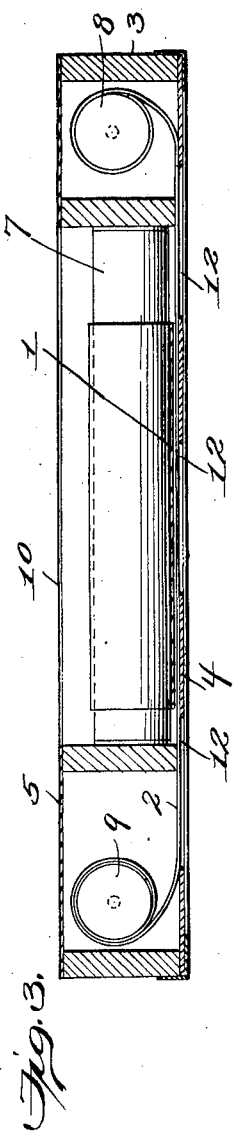
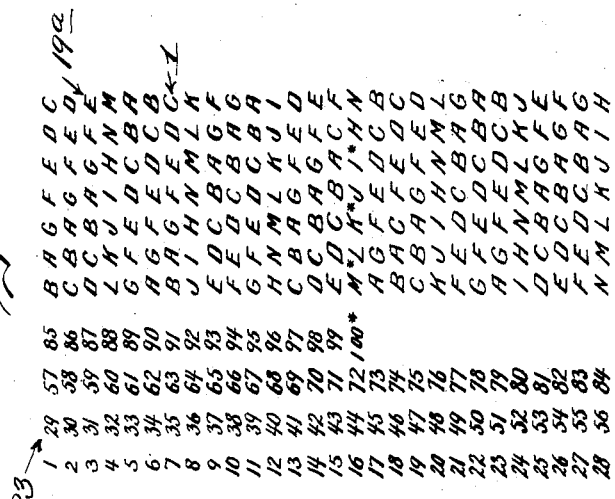
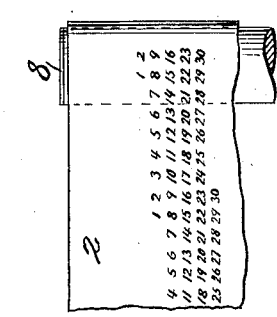
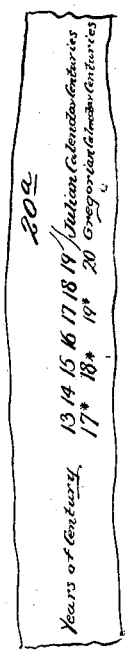
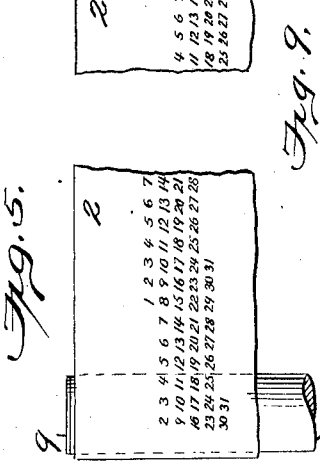
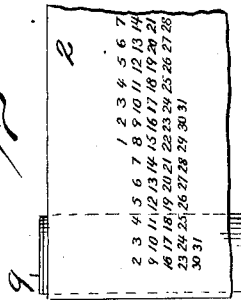

S. G. EDWARDS.
PERPETUAL CALENDAR.
APPLICATION FILED APR. 10, 1919.
1,345,150.
Patented June 29, 1920.
5 SHEETS—SHEET 3.
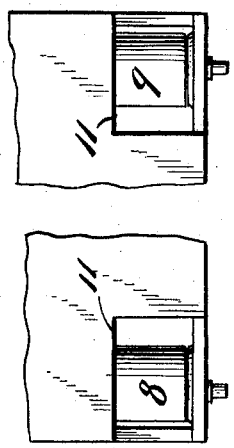
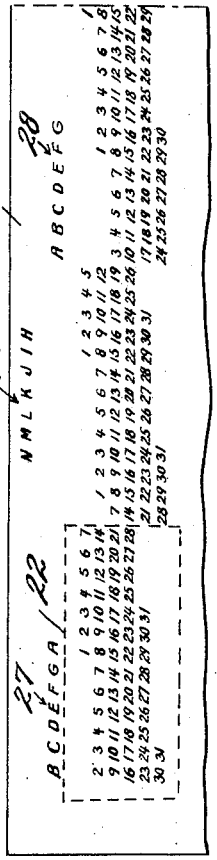
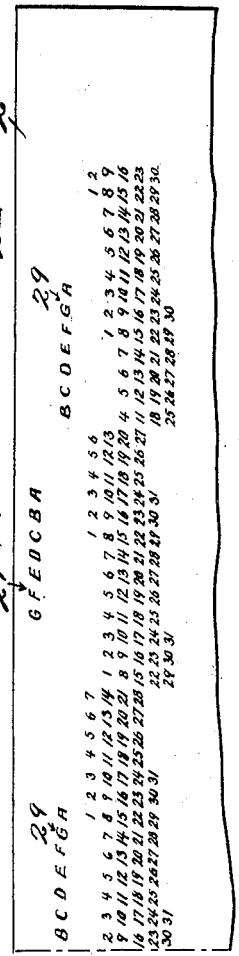
Inventor
Sidney G. Edwards
By
Attorney
Witness

S. G. EDWARDS.
PERPETUAL CALENDAR.
APPLICATION FILED APR. 10, 1919.

1,345,150.

Patented June 29, 1920.
5 SHEETS—SHEET 4.

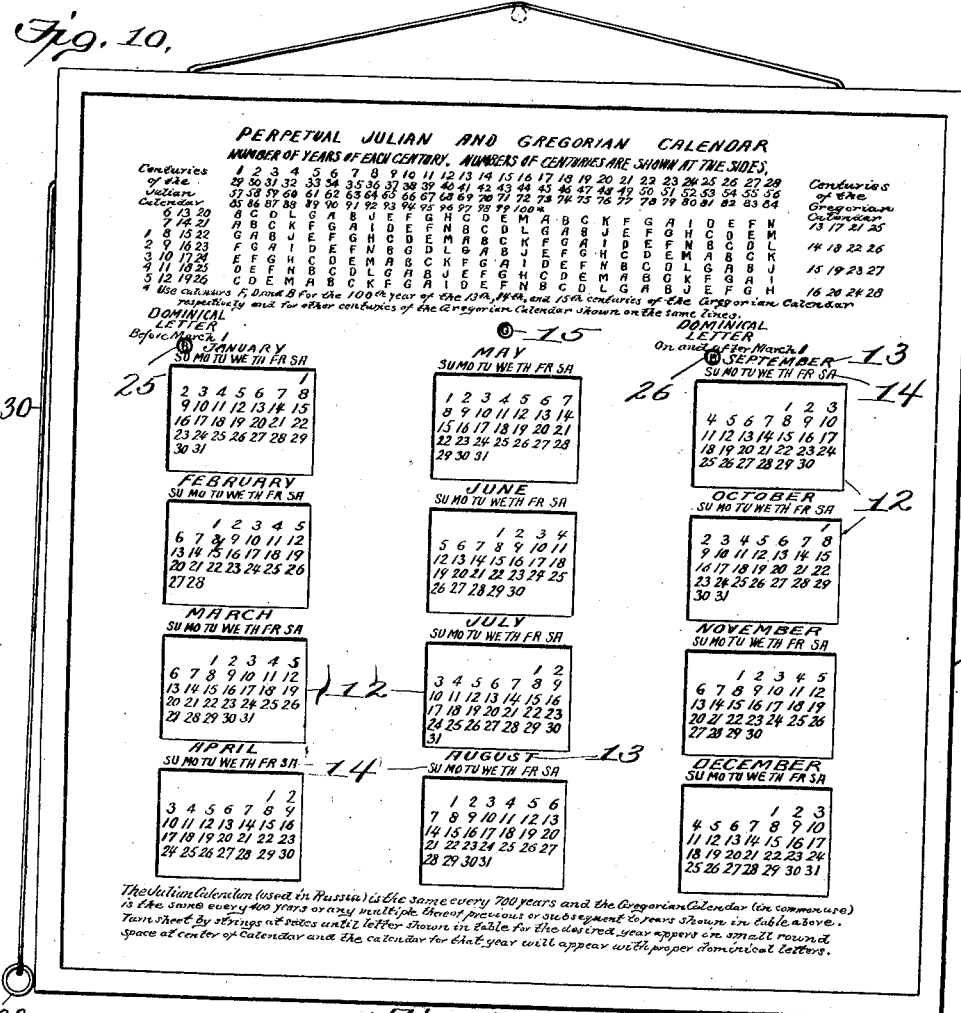
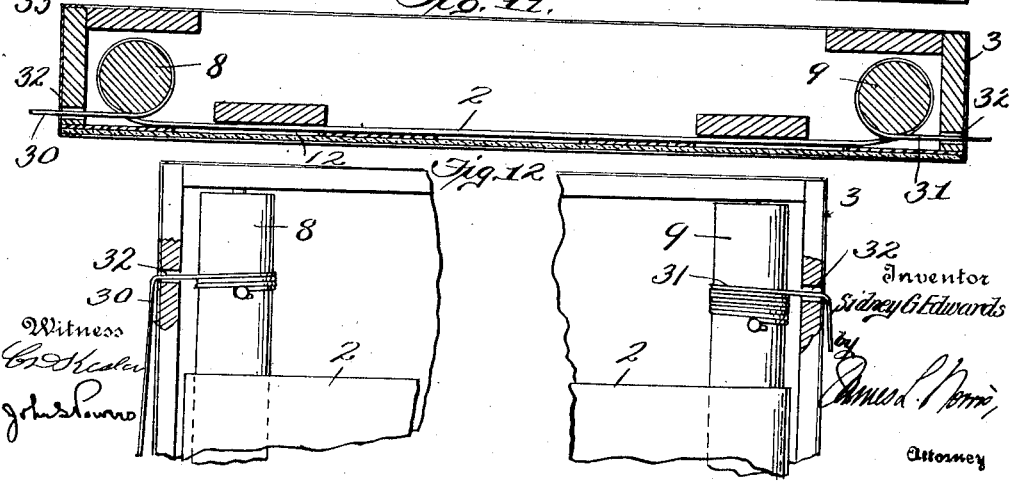

UNITED STATES PATENT OFFICE.

SIDNEY G. EDWARDS, OF ALBANY, NEW YORK.

PERPETUAL CALENDAR.

1,345,150.    Specification of Letters Patent.    Patented June 29, 1920.

Application filed April 10, 1919. Serial No. 289,020.

*To all whom it may concern:*

Be it known that I, SIDNEY G. EDWARDS, a citizen of the United States, residing at Albany, in the county of Albany and State of New York, have invented new and useful Improvements in Perpetual Calendars, of which the following is a specification.

This invention relates to improvements in perpetual calendars, and its principal object is to provide a simply constructed, readily understood, and easily readable calendar by means of which, and with a minimum number of operations, both mental and mechanical, any date falling under either the Julian (old style) or Gregorian (new style) calendars can be quickly ascertained and the calendar for the full year in which such date occurs completely reproduced in standard or conventional form.

The present invention combines in a single instrument, and with reference to a common key and a common calendar chart, both the Julian and Gregorian calendars, mechanically applying them, by means of said key and chart and associated elements, to periods of years in which each calendar repeats itself, the key and chart being so constructed with regard to individual and distinguishing characteristics of the two calendar systems as to reduce to a minimum the number of rules or instructions to be followed in the use of the calendar, and the chart being constructed to display the readings for a full year of either the Julian or Gregorian system.

With the above objects in view, and having the general characteristics stated, the invention consists of certain novel features of structure, combination and relation which will be set forth in detail as the description proceeds.

Embodiments of the invention are illustrated in the accompanying drawings, wherein:—

Figure 1 is an elevation of a calendar in which the features of the invention are incorporated.

Fig. 2 is a vertical central sectional view on the line 2—2 of Fig. 1.

Fig. 3 is a horizontal sectional view on the line 3—3 of Fig. 2.

Fig. 4 is a rear elevation showing a detail of the calendar construction.

Fig. 5 is a detail elevation of the calendar chart and the rollers upon which it is carried.

Figs. 6 and 6ª are views which should be read together or in horizontal continuation, showing in elevation the upper portion of the calendar chart, the limitations of space precluding a showing of the chart, in detail and for its full width, in a single figure.

Figs. 7 and 7ª are views which should be read together or in vertical continuation, showing in elevation the key for use in connection with the calendar chart, the limitations of space precluding a showing of the key, in detail and for its full length, in a single figure.

Fig. 8 is an elevation showing an alternative form of key.

Fig. 9 is a detail elevation of the calendar as adapted to the key shown in Fig. 8.

Fig. 10 is an elevation of a calendar of alternative construction.

Figs. 11 and 12 are vertical and horizontal sectional views, respectively, illustrating details of the calendar shown in Fig. 10.

Similar characters of reference designate corresponding parts throughout the several views.

Referring to Figs. 1 to 7ª:

The calendar comprises a key sheet which is preferably of the form shown in Figs. 7 and 7ª, and a calendar chart 2 of the form shown in Figs. 5, 6 and 6ª. These elements, in the construction disclosed and preferred, are mounted in a suitable frame 3 which carries a front plate 4 and, preferably, a rear plate 5.

The sheet 1 upon which the key data is printed has its ends secured to upper and lower rollers 6 and 7 which are disposed transversely of the frame in the upper portion thereof. The chart 2 has its ends secured to rollers 8 and 9 which are disposed vertically or longitudinally of the frame, adjacent the sides thereof. The structure is rendered more compact by arranging the web of the calendar chart to overlap the lower portion of the web of the key sheet. The key sheet and calendar chart are manipulated or adjusted by means of the rollers upon which they are carried, the said rollers being turned by the fingers from the rear of the frame 1. The panel 5 has an opening 10 through which the rollers 6 and 7 are disclosed and openings 11 (Fig. 4) through which the rollers 8 and 9 are disclosed, the fingers being inserted through said openings for the purpose of turning said rollers.

The plate 4 coöperates with said key and said chart to display the readings of the calendar and bears certain necessary or convenient data which will be explained in detail as the description proceeds. The numerical readings of the chart 2 are displayed in the form of a conventional calendar through twelve openings 12 in the plate 4, and said plate is marked, with relation to said openings, whereby the readings displayed are identified as of a particular month and a particular day of the week. In the construction disclosed, the calendar is read from left to right and accordingly the names of the month have their sequence in horizontal rows. Such names are printed, as at 13, above the respective openings and below each month name are printed, as at 14, the names (abbreviated) of the days of the week, these day names being at the heads of vertical columns of numerals (on the chart 2) in accordance with the conventional calendar readings.

The adjustment of the chart 2 is indicated by means of a key letter or other index which is obtained from the key 1, and which, printed upon the chart, is displayed through an opening 15 in the plate 4, said opening being appropriately located with reference to the openings 12, preferably just above and centrally of the group of openings 12. The data of the key is displayed in a single horizontal row through an opening 16 provided in the plate 4 at a suitable elevation above the opening 15 and consists of designations of specific periods of time and of key letters.

The key shown in Figs. 7 and 7ª involved the arrangement of years by decades for a period of 700 years (e. g. 1201 to 1900) for the Julian calendar, and a period of 400 years (1601 to 2000) for the Gregorian calendar. At the left of the key sheet are the designations 17 of decades of the Julian calendar (e. g. 1201 to 1210, 1211 to 1220, etc.), arranged in a vertical column, and at the right of the key sheet are the designations 18 of decades of the Gregorian calendar, also arranged in a vertical column. Each decade designation of the Julian calendar is associated with and followed by a horizontal row of key letters 19 and certain horizontal rows of these key letters are in common association with the decade designations of the Gregorian calendar while other horizontal rows of the key letters are associated only with the decade designations of the Julian calendar. The key letters of each row are apportioned to the respective successive years of the decade with which said row is associated and the said key letters of course fall in vertical columns common to corresponding years of the several decades.

As a matter of convenience, the plate 4 is preferably provided with suitable explanatory headings or designations above the opening 16. Thus, the designations 17 fall under the heading "Julian calendar" and the columns of numerals of said designations under the associated sub-headings "From" and "To," the designations 18 similarly fall under the heading "Gregorian calendar" and under the associated sub-headings "From" and "To," and the columns of key letters fall under the numerical headings "1" to "0" inclusive, these numerical headings being arranged under the explanatory title "Years of decades."

As a matter of further convenience, the plate 4 may be provided with data indicative of the specific periods or cycles of years appearing on the key, and such data may have any appropriate arrangement and location. It is preferably arranged just below the opening 16 and consists of two horizontal rows of numerals 20 indicative of the centuries of the respective Julian and Gregorian calendars of the periods or cycles covered by the key, these rows of numerals being explained by a suitable legend at the right as designating, the numerals of the upper row the respective centuries of the Julian calendar, and the numerals of the lower row the respective centuries of the Gregorian calendar.

The cycle of the Julian calendar is 28 years, i. e. the calendar is the same, without exception, for every succeeding period of 28 years, whereas the cycle of the Gregorian calendar is 400 years. The key, in order to compensate for this wide variance in the length of the cycles of the respective calendar systems and to apply with equal facility, (i. e. without repetition of operations and without operations of calculation), to either system is constructed to cover a range of Julian years sufficiently extended to provide separately reproduced key letters for all the years of the Gregorian cycle. It is for this reason that the key covers 700 years of the Julian calendar, that is to say, the complete enumeration of key letters for 700 years of the Julian calendar will include a complete enumeration of key letters for the Gregorian cycle of 400 years. The key letters 19 are correlated to a calendar chart, as 2, which is adapted, in coöperation with the plate 4, to give a reading for a complete year of either the Julian or Gregorian calendars and for any years of said calendars. For this purpose, fourteen different key letters "A" to "N" are required in apportionment to and combination with a calendar chart which is capable, in fourteen different operative alinements with the opening 12, of reproducing or disclosing fourteen different yearly calendars which, in the aggregate, cover all yearly calendar variations of the Julian and Gregorian systems. The correlation of the key letters, to the chart, the structure or composition of the key, and the structure or composition of the chart are based upon the following table graphically setting forth the varying yearly calendars included in both systems.

*Yearly calendars.*

| Common years, 365 days. | | | | | | | | | Leap years, 366 days. | | | | | | | |
|---|---|---|---|---|---|---|---|---|---|---|---|---|---|---|---|---|
| Key letters. | | | | | | | Days. | | Days. | Key letters. | | | | | | |
| A | B | C | D | E | F | G | | | | H | I | J | K | L | M | N |
| Su | Mo | Tu | We | Th | Fr | Sa | 31 | January | 31 | Su | Mo | Tu | We | Th | Fr | Sa |
| We | Th | Fr | Sa | Su | Mo | Tu | 28 | February | 28 | We | Th | Fr | Sa | Su | Mo | Tu |
| We | Th | Fr | Sa | Su | Mo | Tu | 31 | March | 31 | Th | Fr | Sa | Su | Mo | Tu | We |
| Sa | Su | Mo | Tu | We | Th | Fr | 30 | April | 30 | Su | Mo | Tu | We | Th | Fr | Sa |
| Mo | Tu | We | Th | Fr | Sa | Su | 31 | May | 31 | Tu | We | Th | Fr | Sa | Su | Mo |
| Th | Fr | Sa | Su | Mo | Tu | We | 30 | June | 30 | Fr | Sa | Su | Mo | Tu | We | Th |
| Sa | Su | Mo | Tu | We | Th | Fr | 31 | July | 31 | Su | Mo | Tu | We | Th | Fr | Sa |
| Tu | We | Th | Fr | Sa | Su | Mo | 31 | August | 31 | We | Th | Fr | Sa | Su | Mo | Tu |
| Fr | Sa | Su | Mo | Tu | We | Th | 30 | September | 30 | Sa | Su | Mo | Tu | We | Th | Fr |
| Su | Mo | Tu | We | Th | Fr | Sa | 31 | October | 31 | Mo | Tu | We | Th | Fr | Sa | Su |
| We | Th | Fr | Sa | Su | Mo | Tu | 30 | November | 30 | Th | Fr | Sa | Su | Mo | Tu | We |
| Fr | Sa | Su | Mo | Tu | We | Th | 31 | December | 31 | Sa | Su | Mo | Tu | We | Th | Fr |

The first seven key letters "A" to "G" inclusive pertain to normal or common years of 365 days, and the remaining seven key letters "H" to "N" inclusive pertain to leap years. The chart is made in two divisions $2^a$ and $2^b$, of which the division $2^b$ (Fig. 6) at the left of the chart is directed to leap years and the division $2^a$ (Fig. $6^a$) at the right of the chart to common years. The chart bears key letters 21 from "A" to "N" inclusive and being the fourteen letters which are used in the composition of the key and are several times repeated throughout the key under the designation 19. Each division of the chart is provided with a row of seven appropriate key levers 21 which are singly disclosed through the opening 15 in the plate 4 and are arranged whereby, as disclosed through said opening, a reading of the chart, as of the yearly calendar to which said key letter applies, and in the conventional yearly calendar form, will be provided by the openings 12. The numerals of the chart are arranged in unit groups or series 22, one of which, for convenience of illustration is marked off in Figs. 6 and $6^a$ by a rectangular formation of broken lines. Each division of the chart has twelve unit groups 22 of numerals, corresponding to the twelve months of the year and arranged in accordance with the arrangement of the openings 12 and of the month names 13 associated with said openings. Each unit group has 13 vertical columns of numerals, any successive seven of which may be displayed through an opening 12; and each of the seven permissible aggroupments of seven successive columns of said numerals constitutes a calendar for the month designated above the opening 12 through which said aggroupment may be displayed as of any of the years to which the key letter 21, then displayed through the opening 15, applies.

The rule that every year divisible by four is a leap year has no exceptions in the Julian calendar, but in the Gregorian calendar it has exceptions as to years divisible by 100 but not divisible by 400. Thus, in the Gregorian calendar period 1601 to 2000 there are ninety-seven leap years, the years 1700, 1800 and 1900 falling within the exception. Such years which thus constitute an exception to the rule for leap years require a special rule for the use of the key, and the application of such special rule is indicated by asterisks which are located on the key 1 beside the appropriate decade designations 18 and on the plate 4 beside the appropriate numerals 20 of the lower row.

In the normal use of the calendar, the key 1 is manipulated to expose through the opening 16 the designation, of the decade, of either the Julian or Gregorian system, within which the year sought is included. Thereupon, the key letter is selected by ascertaining the letter of the group 19 which falls under that numerical heading on the plate 4 which represents the last digit in the designation of the year sought. The chart 2 is then manipulated to expose through the opening 15 that letter of the group 21 which is the key letter as determined by the previous selection from the letters of the group 19. When the key letter is thus displayed through the opening 15, the calendar for the year sought will be displayed in conventional form through the openings 12. To illustrate, let it be assumed that it is desired to learn the day of the week for the twenty-first of September, 1887, Gregorian style. The decade designation 18 will be "1881–1890" and the key is manipulated to expose such decade designation through the opening 16. The final digit of "1887" is "7" and the key letter of the group 19 is exposed through the opening 16 under the numerical heading "7" is "G." The chart 2 is then manipulated to expose the letter "G" of the group 21 through the opening 15, at which time the calendar for the year 1887, Gregorian style, is displayed through the openings 12 and, reading the calendar in the usual manner, the twenty-first of September is found to fall on Wednesday. The proceeding for finding the day of the week for the twenty-first of September, 1887, Julian style is the same, subject to the use of the decade designation of the left-hand column 17. In such case the key letter, ascertained in the same manner, is "E," and the calendar displayed through the openings 12 when the letter "E" of the group 21 is exposed is the calendar for the Julian year 1887 and gives Monday as the day of the week on which the twenty-first of September falls. In like manner the calendar can be used to ascertain the day of the month, either style, of any particular week day, for example the third Tuesday in November, 1869.

When the date sought falls within any of the years of the Gregorian calendar which, as above explained, are exceptions to the rule for leap years, the key letter falling under the number which represents the final digit, i. e. "0," may not be used. For such years there is printed on any convenient part, i. e. the plates 4 or 5, the special rule which gives the particular key letters of the year in question. With regard to the key shown, this rule, reference to which is suggested by the asterisks above referred to is, as follows:

"Use key letters F, D and B for the years 1700, 1800 and 1900, respectively, of the Gregorian calendar and for any multiple of 400 years subsequent thereto."

From the foregoing it will be seen that no calculations whatever are required for the use of the calendar as to any of the years falling within the specific periods covered by the key, and that but two operations, manipulation of the key and manipulation of the chart, are required. In case the date sought be of a year, either past or future, not specified by the key, the key is used by the employment of multiples of 28 or 700, in the case of the Julian calendar, and of 400 in the case of the Gregorian calendar. For example, the future year 1928 of the Julian calendar, and which is not within the period covered by the key, will have the same key letter as the year 1900 (using the multiple 28 as a subtrahend) or as the year 1228 (similarly using the multiple 700), this key letter being "N," and the past year 1181, also not within the period of the Julian calendar covered by the key, will have the same key letter as the year 1209 (using the multiple 28 as an increment) or as the year 1881 (similarly using the multiple 700), this key letter being "E," while the future year 2027 of the Gregorian calendar, also not within the period covered by the key, will have the same key letter as the year 1627 (using the multiple 400 as a subtrahend), this key letter being "F." The calendar, having the features above described may also be utilized to register the dominical letter or letters of a particular year. As each leap year has two of such letters, the first for the months of January and February and the second for the rest of the years it is necessary to provide the plate 4 with two openings 25 and 26 through which the two dominical letters of a leap year may be simultaneously displayed and to provide the leap year division 2$^b$ of the chart 2 with two differentiated groups 27 and 28 of dominical letters, the letters of group 27 applying to the months of January and February and being displayed through the opening 25 and the letters of group 28 applying to the remaining months and being displayed through the opening 26. The groups 27 and 28 are so made up and also so arranged with relation to the group of key letters 21 that the selection of the dominical letters for a particular leap year will be automatically incident to an adjustment of the chart 2 as prescribed by the key letter for the year sought. Normal years have but a single dominical letter for the display of which either of the openings 25 and 26 could be used. It is preferred, however, in the case of normal years, to simultaneously exhibit the same dominical letter through both of said openings. Accordingly, the normal year division 2$^a$ of the chart 2 is provided with two identical groups 29 of dominical letters which are so made up and arranged relatively to the key letters 21 that the selection of the dominical letter for a particular normal year will be automatically consequent to an adjustment of the chart 2 as prescribed by the key letter for the year sought.

Referring to the key letters herein disclosed, the coöperation therewith of the dominical letter group will be apparent from the following table in which the key letter is arranged immediately over the related dominical letter or letters:

| | |
|---|---|
| When the key letter is | A B C D E F G |
| The dominical letter for the whole year (shown through both openings 25 and 26) is | A G F E D C B |
| When the key letter is | H I J K L M N |
| The dominical letter for January and February (shown through opening 25) is | A G F E D C B |
| and for the balance of the year (shown through opening 26) is | G F E D C B A |

The openings 25 and 26 may, of course, have any suitable arrangement or location but they are preferably located, as shown, at the left and right, respectively, of the plate 4 slightly below the opening 15 for the display of the key letters 21 and just to the left of the month designations "January" and "September" and the readings which they display are preferably identified by suitable matter printed above said openings for example in the case of the opening 25 "Dominical letter before March 1" and in the case of the opening 26 "Dominical letter on and after March 1."

Fig. 8 illustrates an alternative form of key 1ª wherein the key letters 19ª are arranged to fall under the numbers of the centuries which, when the key of Fig. 8 is used, will be printed (Fig. 9) on the plate 4 above the opening 16 in two horizontal rows 20ª (similar to the rows 20 previously described), the numbers of the upper row designating the centuries of the Julian calendar and the numbers of the lower row the centuries of the Gregorian calendar. The key letters 19ª are alined in horizontal rows which are in association with horizontal rows of numerals 23, arranged at the left of the key, and representing the years of a century. In the use of the key shown in Fig. 8, the key letter is ascertained as the letter 19ª which alines vertically with the numeral 20ª representing the century of the year sought and which alines horizontally with the numeral 23 representing the particular year of the century. Thus, the year 1918 of the Gregorian calendar has the key letter "C," and in the use of the key of Fig. 8 this letter is exposed through the opening 16 in vertical alinement with the numeral 20 of the group 20ª, this numeral representing the twentieth century, and in horizontal alinement with the numeral 18 of group 23 and which represents the particular year of the century.

Referring to Figs. 10 to 12:

The calendar shown in these figures is the same in its general principles of structure and use as the calendar above described. It differs, however, from the first embodiment in that the key sheet is not provided as a separate physical element and is not adjustable. In lieu of the separate key adjustable. Its rollers 6 and 7 and its display sheet 1, its rollers 6 and 7 and its display opening 16, the key, as 1ª, is printed in full on the front plate 4, preferably above the series of openings 12 and the selection of the appropriate key letter is altogether a mental operation, being effected in the manner which will be obvious from the preceding description. Of course, either form of key, viz: that shown in Figs. 7-7ª or that shown in Fig. 8 may be employed. Fig. 10 shows a key constructed after Figs. 7-7ª.

When the key is thus reproduced in the front sheet 4 the only movable element required is the calendar chart 2 which, as before, is carried by the vertical rollers 8 and 9 which instead of being operated by the fingers may, if desired and as preferred, be operated by any suitable means. For example, and, as shown, the rollers may be provided with operating cords 30 and 31 suitably wound thereon and passed through openings 32 in the adjacent side bars of the frame 3. The cord 30 at the left is pulled to the left to effect a movement of the chart 2 toward the left and the cord 31 at the right is pulled to the right to effect a movement of the chart 2 toward the right; and as each cord is thus operated or pulled the other cord is wound upon the roller to which it is secured. The terminals of the cords carry suitable finger pieces 33 (such as rings) which not only facilitate the manipulation of the cords but also prevent the cord terminals from being drawn through the openings 32 into the frame 3 and thereby further serve as stops to arrest the rotation of the rollers 8 and 9 when the chart 2 has been drawn to the limit of its movement in either direction.

Having fully described my invention, I claim:

1. A perpetual calendar having a sheet bearing a key composed of a group of distinguishing letters, said group including repetitions of said letters and said letters being arranged in vertical columns and horizontal rows in correlation to data in association with said columns and rows whereby any letter may be ascertained as the key letter of a particular year, the enumeration of said letters being sufficiently extensive to adapt said key to a period of 700 years of the Julian calendar system and a period of 400 years of the Gregorian calendar system and the correlated identifying data being adapted to both of said systems, in combination with a movably mounted sheet bearing a calendar chart composed of orderly arranged groups of numerals wherein said groups are apportioned to months and said numerals to days of the month, each group having its numerals in columns adapted in seven different aggroupments of seven successive columns to represent seven different calendars of the month to which said group is apportioned, said chart also bearing the different letters employed in said key, and a plate superposed on said chart, said plate having openings through which any of said aggroupments of the numerals of said chart may be displayed in the aggregate form of a yearly calendar and having another opening through which any one of the letters on said chart may be displayed, the letters on said chart being correlated in arrangement relatively to said groups of numerals whereby when any of said letters is displayed through said last-named opening the calendar displayed through said first-named openings will be as of the years represented by the particular letter displayed.

2. A perpetual calendar having a sheet bearing a key composed of a group of fourteen distinguishing letters, said group including repetitions of said letters and said letters being arranged in vertical columns and horizontal rows in correlation to data in association with said columns and rows whereby any letter may be ascertained as the key letter of a particular year, the enumeration of said letters being sufficiently extensive to adapt said key to a period of 700 years of the Julian calendar system and a period of 400 years of the Gregorian calendar system, and the correlated identifying data being adapted to both of said systems, in combination with a movable sheet bearing a calendar chart composed of orderly arranged groups of numerals disposed in two juxtaposed divisions, each division of said chart bearing a series of seven different letters as employed in said key, one series of letters pertaining to common years and the other series pertaining to leap years, the groups of numerals of each division being apportioned to months and the said numerals to the days of the month, each group having its numerals in columns adapted in seven different aggroupments of seven successive columns to represent seven different calendars of the month to which said group is apportioned, and a plate superposed on said chart; said plate having openings through which any of said aggroupments of the numerals of said chart may be displayed in the aggregate form of a yearly calendar and having another opening through which any one of the letters on said chart may be displayed, the letters on said chart being correlated in arrangement relatively to said groups of numerals whereby when any of said letters is displayed through said last-named opening the calendar displayed through said first-named openings will be as of the year represented by the particular letter displayed.

3. A perpetual calendar having a sheet bearing a key composed of a group of distinguishing letters, said group including repetitions of said letters and said letters being arranged in vertical columns and horizontal rows in correlation to data in association with said columns and rows whereby any letter may be ascertained as the key letter of a particular year of a calendar system, in combination with a movable sheet having a calendar chart composed of groups of numerals orderly arranged in vertical columns and horizontal rows wherein said groups are apportioned to months and said numerals to days of the month, each group having its numerals and columns adapted in seven different aggroupments of seven successive columns to represent seven different calendars of the month to which said group is apportioned, said chart also bearing the different letters employed in said key, and a plate superposed on said chart, said plate having openings through which any of said aggroupments of the numerals of said chart may be displayed in the aggregate form of a yearly calendar and having another opening through which any one of the letters on said chart may be displayed, the letters on said chart being correlated in arrangement relatively to said groups of numerals whereby when any of said letters is displayed through said last-named opening the calendar displayed through said first-named openings will be as of the years represented by the particular letter displayed.

4. A perpetual calendar having a sheet bearing a key composed of groups of distinguishing letters arranged in vertical columns and horizontal rows in correlation to data in association with said columns and rows whereby any letter may be ascertained as the key letter of a particular key of a calendar system, in combination with a sheet bearing a calendar chart composed of orderly arranged groups of numerals wherein said groups are apportioned to months and said numerals to days of the month, each group having its numerals in columns adapted in seven different aggroupments of seven successive columns to represent seven different calendars of the month to which said group is apportioned, said chart also bearing the different letters employed in said key, a plate superposed on both of said sheets and said sheets being movable, independently of one another, relatively to said plate, said plate having openings through which any of said aggroupments of the numerals of said chart may be displayed in the aggregate form of a yearly calender and having another opening through which any one of the letters on said chart may be displayed, the letters on said chart being correlated in arrangement relatively to said groups of numerals whereby when any of said letters is displayed through said last-named opening the calendars displayed through said first-named openings will be as of the years represented by the particular letter displayed, said plate having another opening through which may be displayed a row of the letters of said key and the data borne by said key and correlated to the letters of said row.

5. In a calendar, a sheet bearing a key composed of a group of distinguishing letters, said group including repetitions of said letters and said letters being arranged in vertical columns and horizontal rows in correlation to data in association with said columns and rows whereby any letter may be ascertained as the key letter for a particular year, a second sheet bearing a calendar chart composed of orderly arranged groups of numerals wherein said groups are apportioned to months and said numerals to days of the month, said sheets being movable independently of one another whereby when any of said letters is displayed the portion of the calendar chart for the year represented by the particular letter displayed will be visually associated therewith.

6. In a calendar a group of key letters arranged in vertical columns and horizontal rows, said group including repetitions of said letters, and data associated with said columns and rows whereby any letter may be ascertained as the key letter of a particular year, a movable sheet bearing a calendar chart composed of orderly arranged groups of numerals wherein said groups are apportioned to months and said numerals to days of the months, each group having its numerals in columns to represent seven different calendars of the month to which said group is apportioned, said chart also bearing the different letters employed in said key and a plate superposed on said chart, said plate having openings through which any of said aggroupments of the numerals of said chart may be displayed in the aggregate form of a yearly calendar, and a series of three other openings through one of which the key letter corresponding to the particular common or leap year is exposed, and through the remainder of which the corresponding dominical letters are displayed, said dominical letters being identical for common years and different for leap years, the letters on the said chart being correlated in arrangement relatively to said groups of numerals, whereby when any of said letters are displayed through said series of openings the calendar displayed through said first named openings will be as of the year represented by the particular key letter displayed.

In testimony whereof I have hereunto set my hand in presence of two subscribing witnesses.

SIDNEY G. EDWARDS.

Witnesses:
P. J. FALLAN,
WM. F. KAVANAUGH.